Oct. 29, 1963

R. H. HUDDLESTON, JR 3,109,137

BRIDGE CIRCUIT

Filed March 24, 1959

INVENTOR.
RICHARD H. HUDDLESTON, JR.
BY
Lyon & Lyon
ATTORNEYS

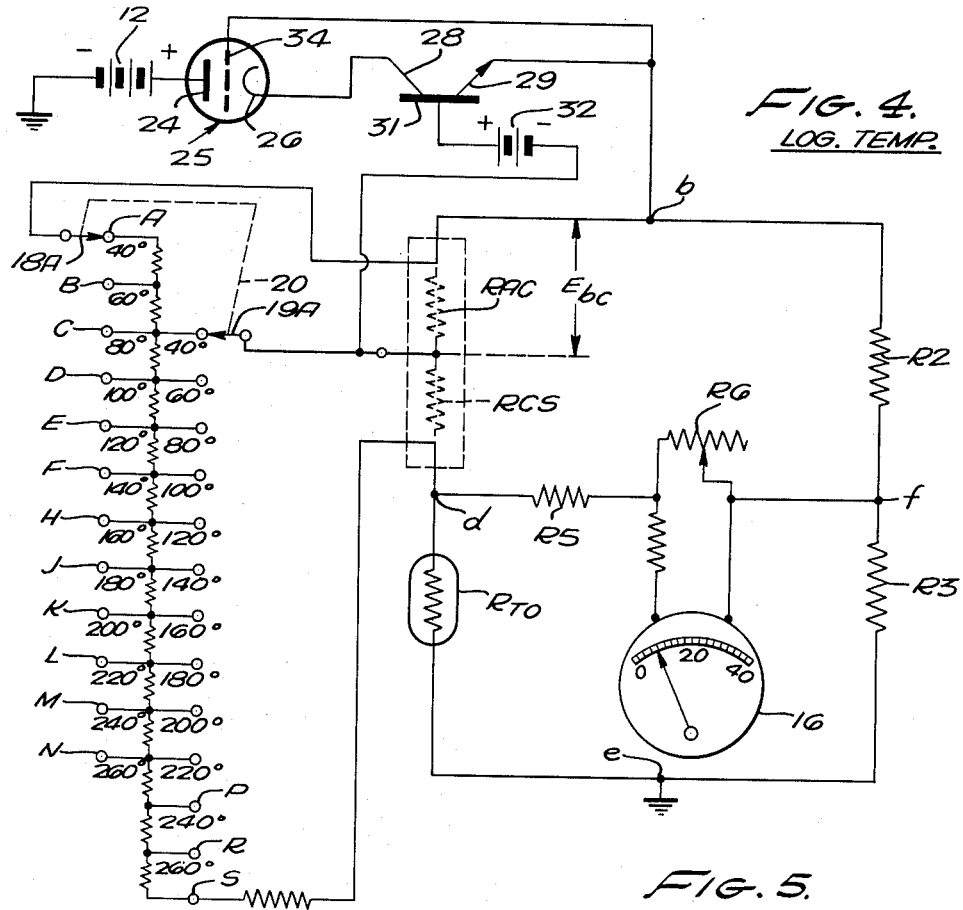
FIG. 4.
LOG. TEMP.
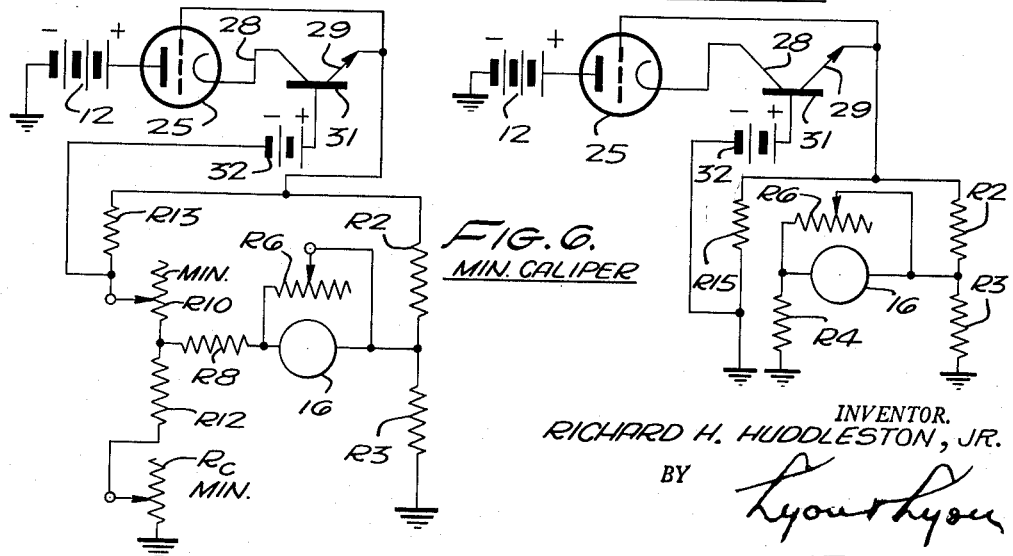
FIG. 5.
CAL. TEMP.
FIG. 6.
MIN. CALIPER
INVENTOR.
RICHARD H. HUDDLESTON, JR.
BY
ATTORNEYS

MAX. CALIPER

CAL. CALIPER

LOG CALIPER

INVENTOR.
RICHARD H. HUDDLESTON, JR.
BY Lyon & Lyon
ATTORNEYS

United States Patent Office 3,109,137
Patented Oct. 29, 1963

3,109,137
BRIDGE CIRCUIT
Richard H. Huddleston, Jr., Houston, Tex., assignor to Halliburton Company, a corporation of Delaware
Filed Mar. 24, 1959, Ser. No. 801,523
18 Claims. (Cl. 323—75)

The present invention relates to improved means and techniques for measuring various quantities in terms of the value of an impedance and finds particular applicability in well logging equipment wherein it is desired to indicate, for example, the temperature of a well bore or its diameter.

In temperature or caliper logging of a well bore it is customary to use a variable resistance which varies in accordance with the condition being measured or indicated. Usually a thermistor is used for that purpose in temperature logging and a separate resistance is used in caliper logging. In the latter instance the resistance is caused to vary in accordance with the diameter of the well bore at the particular location wherein indications are desired. It is, of course, desirable in each instance to achieve the most accurate determinations but difficulties arise when the range of desired measurements is large and the resistance element manifests a non-linear relationship between its magnitude and the condition which is to be indicated. This is particularly true in the case of a thermistor which notoriously has a pronounced non-linear variation over the range of temperatures found in well bores.

Usually the resistance element is incorporated in one arm of a Wheatstone-type bridge and the unbalanced voltage of the bridge, which may be indicated or recorded, serves as an indication of the condition being determined. Because the conditions, particularly temperature conditions, vary over a considerable range and correspondingly the value of the resistance of the thermistor varies accordingly, it is desirable that the temperature indications be indicated or recorded in this range from different base levels for increased sensitivity and accuracy. This necessitates periodic balancing of the bridge when different base temperatures are reached and then selected. As disclosed herein, the base temperature levels are separated by 20° Fahrenheit intervals and the voltage indication means which indicates the unbalanced condition of the bridge serves generally as a vernier in establishing precise temperature readings which are required to be added to the selected base temperature.

Other aspects of the present invention involve the provision of improved means and techniques whereby the voltage measured or indicated at the output terminals or so-called balance points (or in the so-called "galvanometer" arm) of a Wheatstone-type bridge is a linear function of a condition being determined so that no correction factor or separate calibration is required to be used in converting the readings of, for example, a vacuum tube or other type high resistance voltmeter, connected to such output terminals, into precise readings of such condition which may, for example, be temperature or well bore diameter.

Still another aspect of the present invention involves the provision of improved means and techniques whereby the existing calibration of a meter connected across the output terminals of a Wheatstone-type bridge may be used directly as a precise measure of an existing condition such as, for example, the percentage of variation of a parameter from a predetermined value and the same is particularly useful in reading directly, for example, the so-called variation or tolerance of a resistance from its nominal value in the mass production of resistances.

It is therefore an object of the present invention to provide novel teachings and novel arrangements incorporating such teachings for achieving the above indicated results.

A specific object of the present invention is to provide an arrangement wherein a non-linear element forms one arm of a bridge and changes over a considerable range in accordance with changing conditions and means are incorporated whereby the unbalanced bridge voltage varies in substantially a linear manner with said element changes.

Another specific object of the present invention is to provide an improved temperature-measuring system in which the temperature is measured or indicated by a bridge network which may be balanced at different temperature-base levels by switching in different parameters and then incremental changes in temperature from any particular one of the selected base levels may be indicated directly in terms of the unbalanced voltage of the bridge network without the necessity for any correction factor or separate calibration for the output meter of the bridge network.

Another specific object of the present invention is to provide a temperature-measuring system as indicated in the preceding paragraph in which the temperature is indicated by a resistance element in the bridge network which varies non-linearly with respect to temperature and the different parameters switched in at the various temperature bases are "tailored" to match the non-linear variation of such resistance element.

Another specific object of the present invention is to provide an improved well bore calipering system in which variations in diameter of a well bore are indicated in direct and accurate proportions to changes in the output voltage of a bridge network.

Another object of the present invention is to provide an arrangement which allows either temperature or caliper logging of a well bore, using a bridge network having an output voltage which varies in direct and accurate proportion to either the temperature or diameter of the well bore.

Another object of the present invention is to provide an improved bridge network in which the output voltage is caused to vary in direct and accurate proportion to a corresponding change in an electrical value of one of the arms of the network.

Another object of the present invention is to provide a bridge network in which the output voltage serves to provide a direct indication of the percentage of variation of the electrical value of one arm of the network.

Another object of the present invention is to provide a bridge network functioning as indicated in the preceding paragraph and wherein the relative values of two series-connected parameters in another arm of the bridge may be altered to change the output voltage with respect to the same degree of variation in said electrical value of said one arm.

Another object of the present invention is to provide an improved bridge arrangement in which the voltage drop across an element in a bridge network is maintained substantially constant when and as the electrical value of an element in the bridge network varies so as to achieve a linear relationship between the output voltage and variation in said electrical value.

Another object of the present invention is to provide novel means whereby said voltage drop mentioned in the preceding paragraph is maintained substantially constant.

Another object of the present invention is to provide an arrangement particularly useful for incremental measurements of a non-linear thermistor temperature transducer.

Another object of the present invention is to provide an incremental resistance bridge for measurement of deviation from a known standard, calibrated in percent, such as, for example, in the production testing of resistances.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 4 is a simplified schematic diagram of the arrangement shown in FIGURE 3 when the same is conditioned for temperature logging.

FIGURE 5 is a simplified schematic diagram illustrating the apparatus shown in FIGURE 3 when the same is conditioned for temperature calibration.

FIGURE 6 is a simplified schematic diagram of the apparatus shown in FIGURE 3 when the same is conditioned for caliper minimum operation.

Temperature Logging

Figure 2:
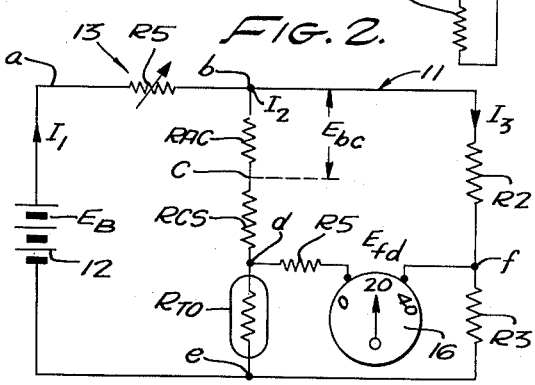
FIGURE 2 is a simplified schematic diagram useful in explaining features of the present invention.
Figure 10:
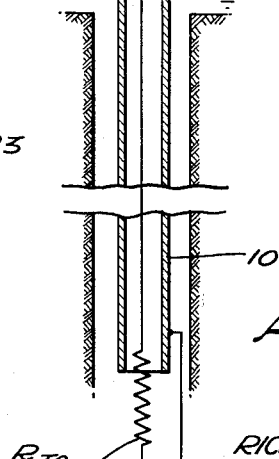
FIGURE 10 illustrates generally the arrangement of apparatus shown in FIGURE 3 with respect to a well bore and it is understood that the resistance shown in the well bore is representative of either a thermistor or a caliper resistance having a value corresponding to the particular diameter of the well bore.

As indicated in FIGURE 10, the apparatus for temperature logging includes a thermistor $R_{T0}$ which is incorporated in a well logging tool lowered in the well bore under investigation. Usually one terminal of the thermistor $R_{T0}$ is grounded to the cable sheath and the other terminal is connected to the internal conductor of the cable 10 which extends upwardly through the well bore and such conductor and sheath are connected to surface equipment which includes other components of the bridge 11 as indicated in FIGURE 10. The thermistor $R_{T0}$ is connected in a Wheatstone-type bridge as illustrated in FIGURE 2 and has a resistance-vs.-temperature variation as indicated by the dotted curve in FIGURE 1. However, to improve the linearity of the variation shown in dotted lines and particularly to lower its value at lower temperatures, the thermistor is shunted by a fixed resistance such that the resistance-temperature variation is represented by the full line curve in FIGURE 1.

The thermistor $R_{T0}$ is connected in a Wheatstone-type bridge 11 as represented in FIGURE 2 which incorporates important features of the present invention. This bridge incorporates four arms, namely a first arm represented by resistance R2, a second arm represented by resistance R3, a third arm represented by the series-connected resistance RAC and RCS, and a fourth arm represented by the thermistor $R_{T0}$ which is understood to have a fixed resistance connected in shunt therewith so as to have the characteristic indicated in full lines in FIGURE 1. For purposes of definition the terminals $b$ and $e$ are referred to as the power input terminals to the bridge; and the terminals $d$ and $f$ are referred to as a pair of output or measuring terminals since the unbalanced bridge voltage appears across the same.

The bridge is supplied from a voltage source represented by the numeral 12 which has one of its terminals connected to the terminal $e$ and the other one of its terminals connected through a controlled resistance represented by the numeral 13 to the other input bridge input terminal $b$. This resistance 13 is so controlled, as explained later, so as to maintain the voltage across resistance RAC substantially constant to achieve important features of the present invention.

While for purposes of simplicity in explaining the broader aspects of the present invention the various bridge arms are illustrated as resistances, it will be appreciated that certain aspects of the present invention may be practiced when the arms are impedances other than the special forms of impedances, i.e. resistances shown in the drawings.

Figure 3:
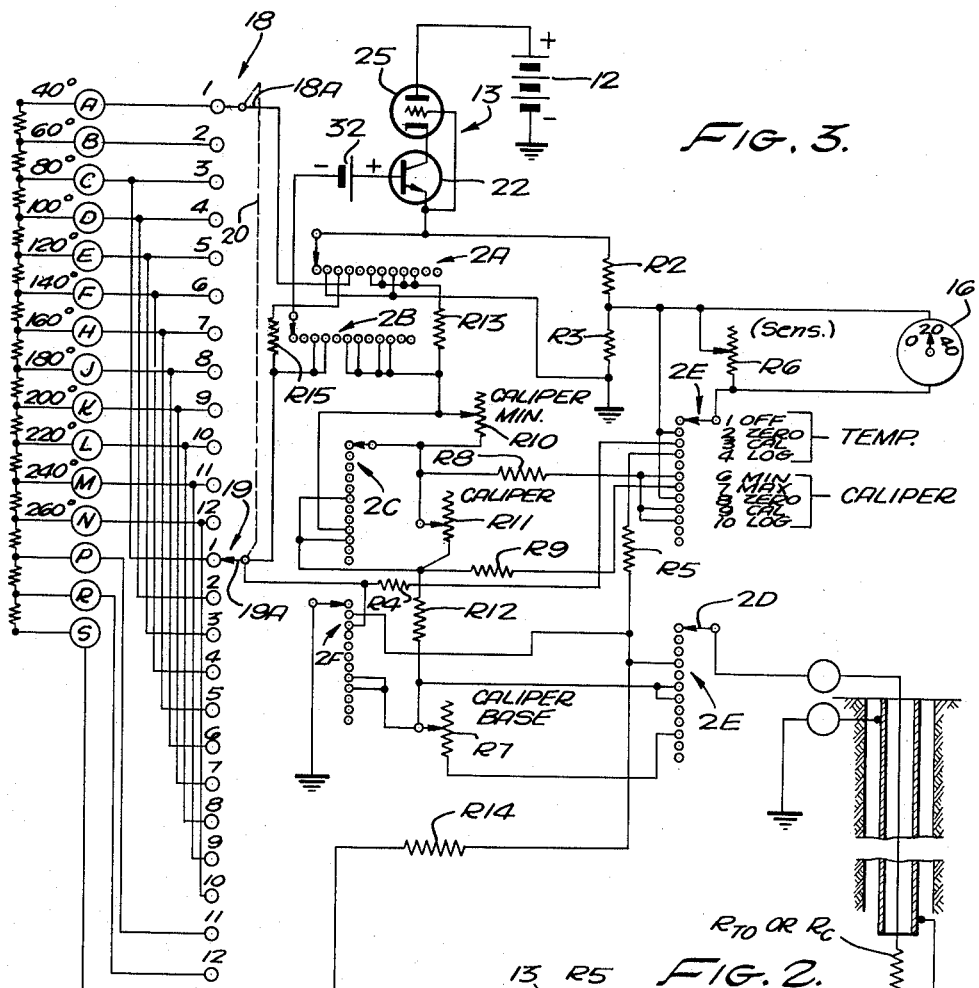
FIGURE 3 is a schematic diagram of a temperature-caliper system embodying features of the present invention.

It can be demonstrated mathematically that when resistances R2 and R3 are of equal value, as is also the case in the practical embodiment shown in FIGURE 3, the unbalanced voltage appearing across the output terminals $d$ and $f$ is represented by the following equation $$E_{fd} = \frac{E_b}{2}\left[\frac{R_{T1} - R_{T0}}{R_{T1} - R_{T2}}\right]$$

where $E_{fd}$ is the unbalanced voltage appearing across terminals $f$ and $d$; $E_{bc}$ is the constantly maintained voltage across terminals $b$ and $c$; $R_{T1}$ is equal to the sum of the resistances of resistance RAC and RCS; $R_{T0}$ is the resistance of the shunted thermistor $R_{T0}$; and $R_{T2}$ is equal to the resistance RCS. The above equation may also be written as follows:

$$E_{fd} = \frac{E_b}{2}\left[\frac{\Delta R_{T0}}{\Delta R_T}\right]$$

where $\Delta R_{T0}$ is the change in thermistor resistance from a pre-established base level and $\Delta R_T$ is the value of RAC.

The above equations are based on a condition wherein R2 and R3 are equal in value. This is a matter of convenience and in such case it allows values of RAC and RCS to be equal to values of the thermistor resistance $R_{T0}$. The system, of course, would still operate if R2 and R3 are not of equal value. Thus, when $R2 = 2R3$, the voltage $E_{fd}$ is then $$E_{fd} = \frac{E_{bc}}{6}\left[\frac{\Delta R_{T0}}{\Delta R_T}\right]$$

It will be seen that in the system described, although the base shift increment corresponds to 20° F., the measurement range span is equal to two base increments or a total of 40° F. As shown in FIGURE 3, the resistance RAC corresponds to a 40° change and this determines the span or range for a particular setting.

It will be further observed that one of the main functions of the system (see FIGURE 2) is to provide automatic adjustment of span or full scale sensitivity at each base temperature setting such that equal spans of temperature indications (in this case 40°) are obtained despite the fact that unequal resistance changes of the thermistor, due to its non-linear characteristic, produce the indications. By analogy, this corresponds to a manual procedure wherein a voltmeter has its full scale sensitivity changed by some means every time the base temperature is changed such that a full scale deflection in every case would result from a 40° F. increase from the particular base temperature in use.

As described more fully hereinafter, the resistances RAC and RCS are representative of only one pair of resistances which are selected by switching means illustrated in FIGURES 3 and 4. These resistances represented by RAC and RCS are pre-established or "tailored" to match the full line thermistor curve illustrated in FIGURE 1 and the voltage across the selected resistance RAC is maintained constant so that each progressive increment (or span) of temperature, being of equal value (40° F., for example), will result in equal output voltage indication between points $f$ and $d$. This may be considered as an automatic sensitivity control function which compensates for the non-linearity of the measured element, as well as the inherent non-linearity of deflection type bridge circuits in general use. The zero and full scale reading will be accurate to the desired extent by component accuracy; however, linearity over each increment (or span) will depend on the linearity of the measured element. Obviously, the linearity will improve as each increment is made smaller. Thus, by accomplishing this result, the indicating means 16 may be directly calibrated in terms of temperature and such calibration is accurate regardless of the particular pair of resistances selected and represented by resistances RAC and RCS.

Referring to FIGURES 2, 3 and 4, the resistance RAC represents the value of the resistance between terminals A and C in FIGURES 3 and 4 and using the same nomenclature the resistance RCS represents the resistance between terminals C and S. For the instant purposes, the resistance R14 may be left out of consideration since the same is for the purpose of providing a compensation for the resistance of the cable connecting the thermistor. This corresponds to the 40° position of the switches 18, 19 having their two arms 18A, 19A arranged to be moved together as indicated by the dotted line 20. The position of switches 18, 19 establishes the base temperature and readings obtained from the indicating means 16 are required to be added to such base temperature. Thus, for example, when the switches 18, 19 are in their 100° position and the means indicates 10°, the temperature of the thermistor is 110°.

Figure 1:
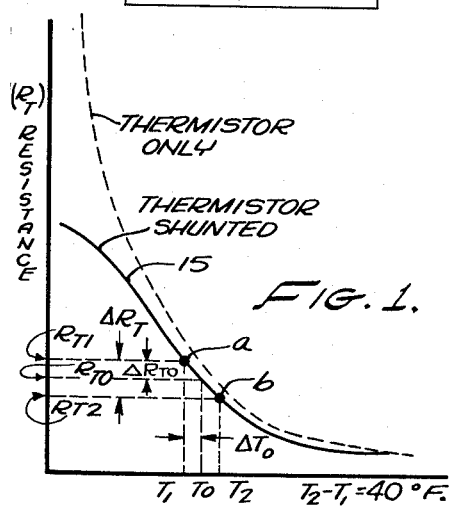
FIGURE 1 illustrates the variation of resistance of the thermistor used in temperature indications and is useful also in explaining features of the present invention.

The values of the individual resistances connected between terminals A—S in FIGURES 3 and 4 for obtaining a match with the thermistor curve 15 in FIGURE 1 may be calculated directly and accurately using an accurate plot of the thermistor curve 15 in FIGURE 1. Usually all of such resistances are interconnected in a plug-in unit having terminals corresponding to terminals A—S.

The method whereby the individual resistances between terminals A—S may be calculated is indicated in FIGURE 1 wherein the ordinate at $T_1$ represents a base temperature and the ordinate at $T_2$ represents a higher selectable base temperature. This difference, as illustrated, is 40° Fahrenheit. Thus, neglecting the value of cable resistance which, however, is subsequently compensated for in the form of R14, the value of the resistance corresponding to RAC is established by reading the difference between $R_{T1}$ and $R_{T2}$, i.e. $\Delta R_T$; and the value of resistance corresponding to RCS is established by reading the value $R_{T2}$. These values are different at different selected base points and thus the individual resistances between terminals A and S differ.

It is further noted in FIGURE 1 that when the thermistor has a resistance $R_{T0}$ corresponding to a temperature increased above the base temperature $T_1$ by an amount $\Delta T_0$, a voltage, i.e. additional temperature, is indicated by the meter in accordance with the above equations. In order to preserve the linear relationship between additional or incremental temperature and voltage, the indicating means 16 is of high resistance such as that of a vacuum tube voltmeter.

In order to achieve such linear relationship, the voltage across resistance RAC is maintained constant. This is accomplished by the use of a transistor 22 functioning as an emitter follower with the resistance corresponding to resistance RAC connected between the base and emitter of the transistor 22 as shown in FIGURES 3 and 4. For this purpose, the ungrounded positive terminal of source 12 is connected to the anode 24 of tube 25 which has its cathode 26 connected to the collector electrode 28 of transistor 22. The emitter electrode 29 is connected to the terminal $b$ and the base electrode 31 is connected to the junction point $c$ between resistances RAC and RCS through constant voltage source 32. The control grid 34 of tube 25 is connected to the terminal $b$. For purposes of definition and reference, the anode 24 and cathode 26 of tube 25 are referred to as output electrodes as are also the collector 28 and emitter 29. The tube 25 is not considered essential; however, the same is preferred since it protects the transistor against excessive power dissipation as well as excessive collector voltage, and it does contribute to better sensitivity control and accuracy. By these means the voltage across the resistance corresponding to RAC is maintained substantially constant by automatic adjustment of the collector resistance of transistor 22.

FIGURE 4 corresponds to FIGURE 3 when the 12-position switch having the 6 ganged switches 2A, 2B, 2C, 2D, 2E, 2F is in its fourth position corresponding to 4 Log-Temp. FIGURE 5 shows the operative portion of the circuit when the 12-position switch is in its third or 3 Cal-Temp. position. In such case the resistance R15 is inserted between the emitter 29 and base 31 and one terminal of R15 is grounded; and one terminal of the indicating means 16 is returned to ground through resistance R4. The sensitivity of the indicating means 16 may then be adjusted by resistance R6, if necessary, so as to obtain a predetermined deflection in the indicating means 16 which is essentially a galvanometer connected, however, as a voltmeter by means of the resistance R4 of high value. Once the calibration is effected as in FIGURE 5, and this is desirably effected prior to any reading of temperature, the system is switched back to the 4 Log-Temp. position to achieve the circuitry shown in FIGURE 4. Assuming that the switches 18A and 19A are then in their 120° positions and the meter 16 reads zero, the temperature of the well is 120°; should the well temperature be 130°, the meter would read 10° which value is required to be added to the 120° base temperature setting. In such 120° base temperature setting it will be observed that the resistance designated RAC is replaced by resistance REH, i.e. the two resistances between switch contacts E and H in FIGURES 3 and 4; and that the resistance designated as RCS is replaced by resistance RHS, i.e. the series of eight resistances between terminals H and S. Regardless of the position of switches 18A, 19A, the voltage drop across the upper resistance typified by resistance RAC or REH is maintained the same by the emitter follower action of transistor 22 so that the unbalanced bridge voltage in all positions of switches 18A and 19A may be expressed by $$\left[ E_{fd} = k \frac{R_{T1} - R_{T0}}{R_{T1} - R_{T2}} \right]$$

and, as explained previously, $R_{T1}$ and $R_{T2}$ have values at the various base temperatures matching the corresponding values on curve 15 in FIGURE 1 to achieve a substantially linear relationship between output voltage and temperature differential at all base settings of switches 18A and 19A.

It is seen from the above that when $E_{fd}$ is measured by a high impedance device as contemplated herein for any preselected increment, such as $T_1 - T_2$ (FIGURE 1), the output voltage $E_{fd}$ measured or indicated varies from zero (when $\Delta R_{T0} = 0$) to the full scale value of $E_{bc}/2$ (when $\Delta R_{T0} = \Delta R_T$). By simultaneously switching in proper values corresponding to RAC and RCS (FIGURES 2 and 4) into the circuit, the entire range of the curve may be covered with equal temperature increments, having equal output signals even though the curve 15 in FIGURE 1 is non-linear.

*Caliper Logging*

The present invention in its broader aspects is also applicable to measurement of incremental changes in an impedance, whether or not the same may be a transducer having a non-linear variation with respect to a condition, the voltage output in the bridge circuit, in either case, being proportional to incremental changes in resistance of the transducer over a particular range of its variation. This feature is accomplished primarily as a result of the voltage across one of the parameters of the bridge such as the voltage $E_{bc}$ in FIGURE 2 being maintained constant when and as the electrical value of the transducer changes in accordance with a condition. This particular aspect of the present invention is now again described in connection with caliper logging and later in connection with the production testing of resistances.

In caliper logging operations, a caliper tool is used which has a variable resistance or transducer mounted thereon whose value changes in accordance with the diameter of the well bore at the particular location of the transducer. Tools of this character are well known and thus need not be described here. Suffice it to say that such transducer may be represented by a variable resistance $R_C$ as in FIGURE 10.

In a typical example, exemplified herein the value of resistance $R_C$ has a value of approximately 1,000 ohms in the closed position of the tool (corresponding to a diameter of 3 inches) and has a maximum value of approximately 2,500 ohms in its open position (corresponding to a diameter of, for example, 13 inches); and the variation of resistance with respect to change in diameter between these limits may be considered to be linear.

Caliper logging involves switching the apparatus illustrated in FIGURE 3 to the various "Caliper" positions indicated therein. The form that such apparatus takes in the Min-Caliper, the Max-Caliper, the Cal-Caliper and Log-Caliper positions of the ganged switches 2A–2F is illustrated respectively in FIGURES 6–9.

The bridge circuit is conditioned for caliper logging using the following techniques. The first step involves conditioning the apparatus as shown in FIGURE 6 wherein R2 and R3, the same ones used in temperature logging and each having values of 10,000 ohms, form a first and a second arm of the bridge. R13 and R10 form the third arm, and R12 and $R_C$ in its minimum resistance position form the fourth arm. R12 and R13 have equal values of, for example, 1,000 ohms. The bridge in FIGURE 6 is balanced using adjustable Min resistance R10 and such adjustment is maintained during further operations. It will be seen that in such case R10 corresponds to the minimum resistance of $R_C$, i.e., the resistance of $R_C$ in the closed position of the caliper tool.

Figure 7:
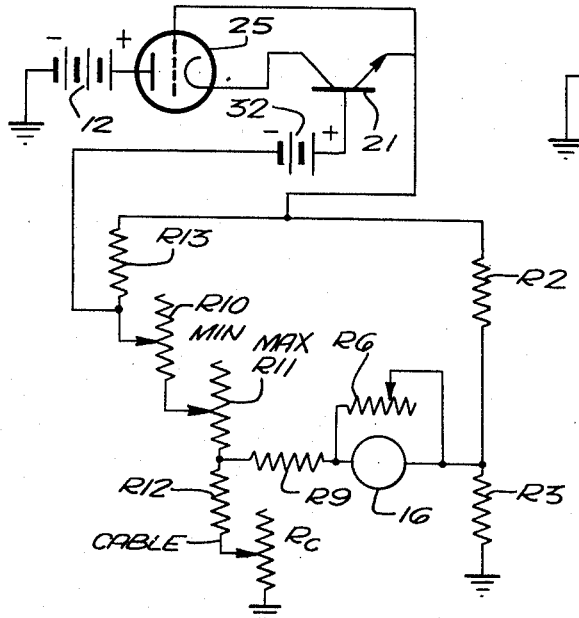
FIGURE 7 is a simplified schematic diagram illustrating the apparatus shown in FIGURE 3 when the same is conditioned for caliper maximum operation.

The second operation involves switching the apparatus to the Max-Caliper arrangement shown in FIGURE 7 wherein the Max resistance R11 is switched in the third arm and also $R_C$ now has its maximum value corresponding, for example, to the 13 inch open position of the logging tool, the tool at this time not being in the well bore. The bridge is balanced by adjusting R11 and this adjustment when made is not subsequently disturbed. It will thus be seen that resistance R11, after this adjustment has been made, is equal in value to the difference in resistance of $R_C$ between the open and closed positions of the caliper tool.

Figure 8:
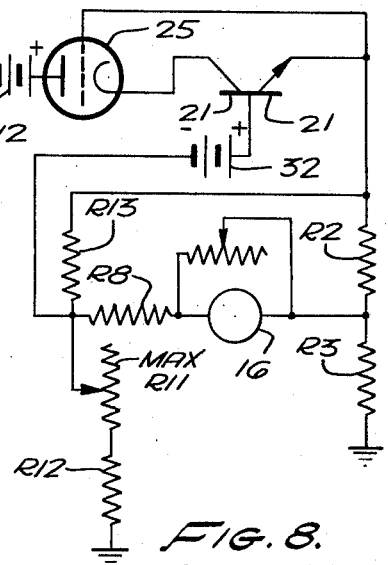
FIGURE 8 is a simplified schematic diagram illustrating the apparatus shown in FIGURE 3 when the same is conditioned for caliper calibration operation.

The apparatus is then switched to the Cal-Caliper position illustrated in FIGURE 8 in which case only resistance R13 forms the third arm and resistances R11 and R12 form the fourth arm, the first and second arms of the bridge comprising respectively R2 and R3 being the same as in the two previous adjustments. Since R12 is equal to R13, it is apparent that the bridge will be unbalanced in an amount depending upon the previously adjusted value of R11 which thus indicates a 10 inch range of unbalance which is to be expected in subsequent caliper logging. The sensitivity control R6 is then adjusted to obtain a suitable and predetermined deflection in the indicating means 16 which may be a galvanometer of a recorder or any other suitable current indicating means. It is noted that R8 and R9 (FIGURE 7) each have relatively high values so that a very small current relative to that current which flows in the bridge arms flows through the indicating means 16. Once the adjustment of R6 has been thus made, it is maintained during subsequent caliper logging.

The Cal-Caliper operation thus allows the operator to calibrate the system in terms of, for example, millimeter deflection of the indicating means per inch variation of the caliper tool since the value R11 is representative of the distance the caliper transducer has moved for a 10 inch change in hole size. Further reference to such calibration is made hereinafter.

Further conditioning of the apparatus may involve an arrangement of the circuitry shown in FIGURE 3 to the Zero Caliper position wherein, among other things, the indicating means 16 is short-circuited for checking and possible adjustment of the zero position of the indicating means 16 using its built-in conventional adjusting means for that purpose.

Figure 9:
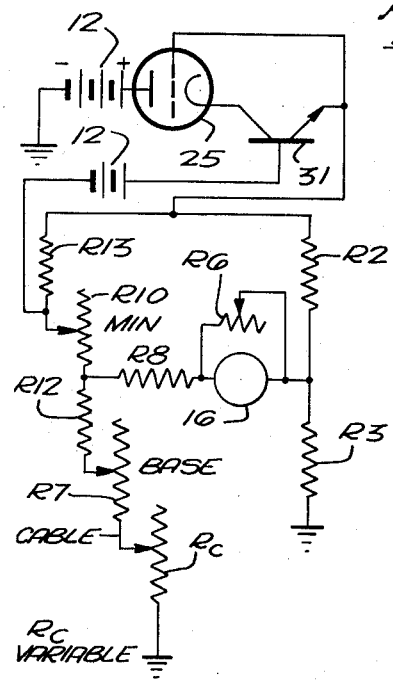
FIGURE 9 is a simplified schematic diagram illustrating the apparatus shown in FIGURE 3 when the same is conditioned for caliper logging.

Then, for caliper logging the circuitry is arranged as illustrated in its Log-Caliper condition in FIGURE 9. In such case the first and second arms R1 and R2 are the same as in all previous adjustments. The third arm comprises R13 and the preadjusted resistance R10. The fourth arm comprises R12, a so-called adjustable base resistance R7 and the caliper resistance $R_C$ which is now in the well bore and which varies between its minimum and maximum positions in accordance with the particular diameter of the well bore at which the same is located while the tool is being moved in the well bore. The base resistance R7 is found particularly useful when it is desired to produce recordings with respect to a predetermined base line or zero line of a recording medium which in conventional practice is moved in synchronism with the caliper logging tool. Once the resistance R7 has been so adjusted, it is maintained and subsequent variations in current through the indicating means is due solely to variations in the caliper resistance $R_C$.

It will be seen from the discussion of the mode of the operation of the bridge described in connection with temperature logging that the resulting current change through the indicating means 16 is in direct and linear proportion with respect to the magnitude of the change in $R_C$. This is so since the voltage drop across resistance R13 is maintained substantially constant by the transistor 22 when and as $R_C$ is varied. This linear relationship between changes in the resistance in the fourth arm, comprising R7 and $R_C$, allows a range of preadjustment of R7 without disturbing the linear variation between changes in $R_C$ and resulting incremental current changes in indicating means 16. These incremental current changes may be correlated with respect to the deflection of the indicating means 16 produced in the Cal-Caliper condition described above wherein the deflection obtained is a measure of the extreme variation of the caliper transducer from, for example, a 3-inch position to a 13-inch position.

*Production Testing of Resistances*

Certain features of the bridge circuit described above for temperature and caliper logging in FIGURES 4 and 9, respectively, may perhaps be best explained in connection with the following described modification of the system illustrated in FIGURE 11.

Figure 11:
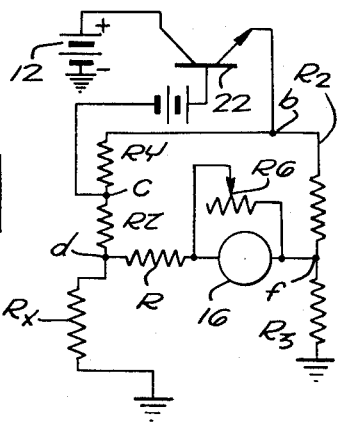
FIGURE 11 illustrates a modified form of the invention useful in production testing of resistances.

FIGURE 11 illustrates a system useful in the production testing of resistances. It illustrates an incremental bridge for measurement of deviation from a known standard, calibrated in percent of deviation.

The bridge in FIGURE 11 includes the same resistances R2 and R3 in a first and second arms of a Wheatstone-type bridge. The third arm comprises the serially-connected resistances RY and RZ and the fourth arm comprises one of a plurality of resistances RX which are being tested for tolerance or deviation from a nominal value.

The voltage drop across RY is maintained constant by the transistor as previously explained.

When, for example, it is desired to test resistances RX having a nominal value of 10,000 ohms, the resistances RY and RZ may have a value of 1,000 ohms and 9,000 ohms, respectively, and R2 and R3 have equal values. If the resistance RX under test has an actual value equal to its nominal value, namely 10,000 ohms, the indicating means 16 reads zero.

Should, however, the resistance RX under test have a value other than 10,000 and be represented by RX, the voltage $E_{fd}$ in accordance with the above equation is equal to $$E_{fd} = \frac{E_{bc}}{2}\left[\frac{RY + RZ - RX}{RY}\right]$$

where $RY + RZ$ corresponds to $R_{T1}$ in the above equation and RX corresponds to $R_{T0}$ and RY corresponds to $R_{T1} - R_{T2}$, or, $$E_{fd} = K\left[\frac{10{,}000 - RX}{1{,}000}\right]$$

or, $$E_{fd} = K_1[10{,}000 - RX]$$

Thus, the voltage measured by the indicating means 16 which is connected in series with a relatively high resistance R8 is a direct measure of the deviation of RX from the 10,000 ohm nominal value. In the above equations K and $K_1$ are both constants. The indicating means 16 may thus be calibrated in terms of percent deviation from the nominal value. Thus, the values of RY and RZ are so chosen that their sum is equal to the nominal value of RX; and it will be seen that the relative values of RY and RZ determine the sensitivity of the measurement. For example, if RY were 2,000 ohms and RZ were 8,000 ohms, a lesser voltage $E_{fd}$ is developed for purposes of indicating percentage of deviation.

Thus, referring again to the caliper logging system shown in FIGURE 9, it may be seen from the above explanation of FIGURE 7 that an incremental change in $R_C$ produces a corresponding incremental change in the current through indicating means 16, and that the changes are in direct proportion to each other and thus the indicating means may be calibrated in terms of deviation from a particular well bore diameter, which in this case is the minimum well bore diameter established previously in terms of the preadjusted value of R10.

For perhaps a better understanding of the operation of the calipering system reference is now made to the following mathematical relationships.

As a result of the Cal-Caliper operation above, it can be demonstrated, using the equations above, that the voltage developed across the bridge output arms $E'_{df}$ is as follows:

$$E_{df}' = \frac{E_{bc}R11}{2R13}$$

when, as in the present case, R12 is equal to R13.

Similarly, during the Log-Caliper operation, the voltage $E''_{df}$ developed across such output terminals is as follows:

$$E_{df}'' = \frac{E_{bc}}{2R13}R7 + R_C - R10$$

Further, since in accordance with important features of the present invention $E_{bc}$ is maintained constant during both calibration and logging the ratio of these two voltages may be expressed as follows:

$$\frac{E_{df}''}{E'_{df}} = \frac{R7}{R11} + \frac{R_C - R10}{R11}$$

Thus, it will be seen that recordings made during caliper logging may be readily interpreted in terms of deviation of the well bore diameter (variable $R_C$) from a predetermined diameter (R10 which has been preadjusted to a value corresponding to a minimum diameter).

Further, it will be clear that the present arrangement is thus adapted to be used with different caliper logging tools of different nominal diameters having resistances which denote different diameters and also with different recorders having different base or reference lines with respect to which deviations in diameter are to be recorded. This should be clear from the last equation where R7, R10 and R11 are adjustable for such adaptation.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. In a measuring system of the character described, a four-arm bridge network having a pair of power input terminals and a pair of output measuring terminals, a first series circuit between said power terminals comprising a first impedance means and a second impedance means which form respectively a first and a second arm of said bridge and which are interconnected at one of said measuring terminals, a second series circuit between said power terminals comprising a third impedance means and a fourth impedance means which form respectively a third and a fourth arm of said network and which are interconnected at a second one of said measuring terminals, adjustable impedance means, a power source connected in series with said adjustable impedance means and said power terminals, said third impedance means comprising a pair of series-connected impedances, and means automatically adjusting the magnitude of said adjustable impedance means to maintain the voltage across one of said pair of impedances substantially constant.

2. In a measuring system of the character described, a four-arm bridge network having a pair of power input terminals and a pair of output measuring terminals, a first series circuit between said power terminals comprising a first impedance means and a second impedance means which form respectively a first and a second arm of said bridge and which are interconnected at one of said measuring terminals, a second series circuit between said power terminals comprising a third impedance means and a fourth impedance means which form respectively a third and a fourth arm of said network and which are interconnected at a second one of said measuring terminals, adjustable impedance means, a power source connected in series with said adjustable impedance means and said power terminals, said third impedance means comprising a pair of series-connected impedances, and means automatically adjusting the magnitude of said adjustable impedance means to maintain the voltage across one of said pair of impedances substantially constant, said fourth impedance means comprising an impedance exhibiting a non-linear relationship between a condition and resistance and which is subjected to said condition, and means for adjusting the magnitude of said third impedance means.

3. A system as set forth in claim 2 in which said first and said second impedance means have substantially equal values and the voltage developed across said measuring terminals is in proportion to the following relationship $$\frac{Z_{T1} - Z_{T0}}{Z_{T1} - Z_{T2}}$$

where $Z_{T1}$ is the magnitude of said third impedance means, $Z_{T0}$ is the magnitude of said fourth impedance means and $Z_{T2}$ is the magnitude of one of said pair of impedances.

4. A system as set forth in claim 2 in which said fourth impedance means comprises a thermistor for indicating the temperature in a well bore.

5. A system as set forth in claim 3 in which said fourth impedance means comprises a thermistor for indicating the temperature in a well bore.

6. In a measuring system of the character described, a four-arm bridge network having a pair of power input terminals and a pair of output measuring terminals, a first series circuit between said power terminals comprising a first impedance means and a second impedance means which form respectively a first and a second arm of said bridge and which are interconnected at one of said measuring terminals, a second series circuit between said power terminals comprising a third impedance means and a fourth impedance means which form respectively a third and a fourth arm of said network and which are interconnected at a second one of said measuring terminals, adjustable impedance means, a power source connected in series with said adjustable impedance means and said power terminals, said third impedance means comprising a pair of series-connected impedances, and means automatically adjusting the magnitude of said adjustable impedance means to maintain the voltage across one of said pair of impedances substantially constant, said adjustable impedance means comprising a transistor having a control element and a pair of output elements, one of said output elements being connected to one terminal of said source and the other output terminal being connected to one of said power terminals, said one of said pair of impedances being connected between said control element and the last mentioned power terminal.

7. In a measuring system of the character described, a four-arm bridge network having a pair of power input terminals and a pair of output measuring terminals, a first series circuit between said power terminals comprising a first impedance means and a second impedance means which form respectively a first and a second arm of said bridge and which are interconnected at one of said measuring terminals, a second series circuit between said power terminals comprising a third impedance means and a fourth impedance means which form respectively a third and a fourth arm of said network and which are interconnected at a second one of said measuring terminals, adjustable impedance means, a power source connected in series with said adjustable impedance means and said power terminals, said third impedance means comprising a pair of series-connected impedances, and means automatically adjusting the magnitude of said adjustable impedance means to maintain the voltage across one of said pair of impedances substantially constant, said adjustable means comprising a vacuum tube having a pair of output electrodes and a control electrode, and a transistor having a pair of output electrodes and a control element, one of said output electrodes of said tube being connected to one terminal of said power source and the other output electrode of said tube being connected to one output electrode of said transistor, the other output electrode of said transistor being connected to one power terminal of said bridge network, said one of said impedances being connected between said control element and the last mentioned power terminal, and the control electrode of said tube being connected to the last mentioned power terminal.

8. In a measuring system of the character described, a four-arm bridge network having a pair of power input terminals and a pair of output measuring terminals, a first series circuit between said power terminals comprising a first impedance means and a second impedance means which form respectively a first and a second arm of said bridge and which are interconnected at one of said measuring terminals, a second series circuit between said power terminals comprising a third impedance means and a fourth impedance means which form respectively a third and fourth arm of said network and which are interconnected at a second one of said measuring terminals, fifth impedance means, a power source having corresponding terminals connected to corresponding power terminals through said fifth impedance means, said third impedance means comprising a pair of impedances, and means for automatically adjusting the magnitude of said fifth impedance means to maintain the voltage drop across one of said pair of impedances substantially constant when and as the magnitude of said fourth impedance changes.

9. A system as set forth in claim 8 including means for adjusting the magnitude of said one of said pair of impedances.

10. In a measuring system of the character described, a four-arm bridge network having a pair of power input terminals and a pair of output measuring terminals, a first series circuit between said power terminals comprising a first impedance means and a second impedance means which form respectively a first and a second arm of said bridge and which are interconnected at one of said measuring terminals, a second series circuit between said power terminals comprising a third impedance means and a fourth impedance means which form respectively a third and fourth arm of said network and which are interconnected at a second one of said measuring terminals, a power source having corresponding terminals connected to corresponding power terminals, said third impedance means comprising a pair of impedances, means for maintaining the voltage drop across one of said pair of impedances substantially constant when and as the magnitude of said fourth impedance changes, and means for adjusting the magnitude of said one of said pair of impedances, said last-mentioned means including a plurality of resistances and switching means for selectively connecting one of said plurality of impedances in said third arm.

11. In a measuring system of the character described, a four-arm bridge network having a pair of power input terminals and a pair of output measuring terminals, a first series circuit between said power terminals comprising a first impedance means and a second impedance means which form respectively a first and a second arm of said bridge and which are interconnected at one of said measuring terminals, a second series circuit between said power terminals comprising a third impedance means and a fourth impedance means which form respectively a third and fourth arm of said network and which are interconnected at a second one of said measuring terminals, a power source having corresponding terminals connected to corresponding power terminals, said third impedance means comprising a pair of impedances, means for maintaining the voltage drop across one of said pair of impedances substantially constant when and as the magnitude of said fourth impedance changes, means for adjusting the magnitude of said one of said pair of impedances, said last mentioned means including a plurality of resistances and switching means for selectively connecting one of said plurality of impedances in said third arm, and said switching means when operated serving also to insert in said third arm a different impedance for the other one of said pair of impedances.

12. In a four-arm Wheatstone type of bridge network in which a first pair and a second pair of bridge arms are each serially connected between the power input terminals of the bridge and one of said arms of said first pair includes a variable impedance the magnitude of which is to be determined, and the other one of said arms of said first pair comprises a pair of series-connected impedances, and adjustable means are provided to adjust the voltage applied to said power input terminals, the improvement which resides in automatically controlling said adjustable means to maintain the voltage drop across one of said pair of impedances substantially constant when and as the magnitude of said variable impedance is varied.

13. A network as set forth in claim 12 in which the voltage at the junction of said first pair of arms is in proportion to the following relationship $$\frac{Z_{T1}-Z_{T0}}{Z_{T1}-Z_{T2}}$$

where $Z_{T1}$ is the combined magnitude of said pair of impedances, $Z_{T0}$ is the magnitude of said variable impedance and $Z_{T2}$ is the magnitude of one of said pair of impedances.

14. In a Wheatstone type of bridge network in which a pair of bridge arms are serially connected between the power input terminals of the bridge and one of said arms includes a variable impedance the magnitude of which is to be determined, and the other one of said arms comprises a pair of series-connected impedances, the improvement which resides in maintaining the voltage drop across one of said pair of impedances substantially constant when and as the magnitude of said variable impedance is varied, said variable impedance exhibiting a non-linear relationship between the magnitude of its impedance and a condition and means being provided to adjust the magnitude of each of said pair of impedances depending upon the particular state of said condition.

15. A network as set forth in claim 14 in which said variable impedance comprises a thermistor in a well bore for indicating its temperature.

16. In a Wheatstone type bridge network comprising four arms, a variable impedance in one arm responsive to a condition, a second arm of said network comprising a pair of series connected impedances, adjustable means connected to said bridge for energizing the same at different voltages, and means automatically adjusting said adjustable means to maintain the voltage drop across one of said pair of impedances substantially constant as the magnitude of said variable impedance is varied.

17. A system as set forth in claim 12 in which said variable impedance is a caliper resistance which changes in accordance with the diameter of a bore hole.

18. A system as set forth in claim 2 in which said fourth impedance comprises a caliper resistance which changes in accordance with the diameter of a bore hole.

References Cited in the file of this patent

UNITED STATES PATENTS

| | | |
|---|---|---|
| 2,356,733 | Banker | Aug. 29, 1944 |
| 2,639,411 | Schafer | May 19, 1953 |
| 2,740,093 | Ammon | Mar. 27, 1956 |
| 2,747,158 | Le Bel | May 22, 1956 |
| 2,759,150 | Rosenbaum | Aug. 14, 1956 |
| 2,771,579 | Ruge | Nov. 20, 1956 |
| 2,824,279 | Ferre et al. | Feb. 18, 1958 |
| 2,830,252 | Amey et al. | Apr. 8, 1958 |
| 2,901,685 | Alder | Aug. 25, 1959 |
| 2,951,200 | Critchlow | Aug. 30, 1960 |